US008872366B2

(12) United States Patent
Campion et al.

(10) Patent No.: US 8,872,366 B2
(45) Date of Patent: Oct. 28, 2014

(54) SCALABLE PORTABLE MODULAR POWER PLANT

(71) Applicant: APR Energy, LLC, Jacksonville, FL (US)

(72) Inventors: Edmund M. Campion, Jacksonville, FL (US); John J. Campion, Jacksonville, FL (US)

(73) Assignee: APR Energy, LLC, Jacksonville, FL (US)

( * ) Notice: Subject to any disclaimer, the term of this patent is extended or adjusted under 35 U.S.C. 154(b) by 0 days.

(21) Appl. No.: 13/909,336

(22) Filed: Jun. 4, 2013

(65) Prior Publication Data

US 2014/0210213 A1    Jul. 31, 2014

Related U.S. Application Data

(60) Provisional application No. 61/758,815, filed on Jan. 31, 2013.

(51) Int. Cl.
| F02B 63/04 | (2006.01) |
| H02K 7/18 | (2006.01) |
| F02D 25/00 | (2006.01) |
| F01C 13/00 | (2006.01) |
| F02C 6/00 | (2006.01) |

(52) U.S. Cl.
USPC .......................... 290/1 A; 290/4 A; 290/4 R

(58) Field of Classification Search
USPC ....... 290/1 A, 2, 1 B, 4 R, 4 A, 30 A; 307/68; 105/35; 52/79.12, 79.1; 123/3
See application file for complete search history.

(56) References Cited

U.S. PATENT DOCUMENTS

| 2,491,434 | A | * | 12/1949 | Yellott .............................. 290/2 |
| 3,602,730 | A | * | 8/1971 | Cushing ........................ 307/150 |
| 3,925,679 | A | * | 12/1975 | Berman et al. ................ 290/1 R |
| RE30,229 | E | * | 3/1980 | Berman et al. ................ 290/1 R |
| 4,808,835 | A | * | 2/1989 | Tsuji et al. ..................... 290/4 A |
| 5,517,822 | A | * | 5/1996 | Haws et al. ..................... 60/618 |
| 5,873,708 | A | | 2/1999 | Delhomme, II et al. |
| 5,907,970 | A | * | 6/1999 | Havlovick et al. ................ 74/16 |
| 6,188,139 | B1 | * | 2/2001 | Thaxton et al. ............... 290/4 R |
| 6,601,542 | B2 | | 8/2003 | Campion |
| 6,630,756 | B2 | * | 10/2003 | Kern et al. ....................... 310/52 |
| 6,644,247 | B2 | | 11/2003 | Campion |
| 6,765,304 | B2 | * | 7/2004 | Baten et al. ................... 290/1 A |
| 6,895,903 | B2 | | 5/2005 | Campion |
| 6,954,003 | B2 | * | 10/2005 | Dull et al. ..................... 290/4 R |
| 7,007,966 | B2 | | 3/2006 | Campion |
| 7,042,110 | B2 | * | 5/2006 | Mikhail et al. .................. 290/44 |

(Continued)

FOREIGN PATENT DOCUMENTS

| AU | 3892897 A | 2/1998 |
| AU | 2008261181 A1 | 12/2008 |

(Continued)

*Primary Examiner* — Julio Gonzalez
(74) *Attorney, Agent, or Firm* — DLA Piper LLP (US)

(57) ABSTRACT

A scalable portable modular power plant that includes an electrical substation module containing a substation container with a first transformer and a second transformer positioned at the first and second ends of the substation container, and a plurality of containerized electric generator modules each positioned relative to a corner of the substation module, where each electric generator module is connected to one of the two transformers.

14 Claims, 6 Drawing Sheets

(56) References Cited

U.S. PATENT DOCUMENTS

| | | |
|---|---|---|
| 7,081,682 B2 | 7/2006 | Campion |
| 8,294,285 B2 * | 10/2012 | Hunter ............... 290/1 R |
| 8,549,869 B1 * | 10/2013 | Whitted et al. ............ 62/259.2 |
| 2003/0029390 A1 | 2/2003 | Campion |
| 2003/0030246 A1 | 2/2003 | Campion |
| 2003/0030279 A1 | 2/2003 | Campion |
| 2003/0030281 A1 | 2/2003 | Campion |
| 2003/0033994 A1 | 2/2003 | Campion |
| 2005/0193270 A1 | 9/2005 | Fornasiero et al. |
| 2008/0185048 A1 * | 8/2008 | Mellon et al. ............ 137/343 |
| 2009/0134625 A1 * | 5/2009 | Altenschulte ............ 290/44 |
| 2009/0194041 A1 * | 8/2009 | Lobsiger ............... 123/2 |
| 2010/0264666 A1 | 10/2010 | Bo et al. |
| 2011/0049733 A1 | 3/2011 | Ferree et al. |
| 2011/0198847 A1 * | 8/2011 | Hopewell ............ 290/44 |
| 2011/0282503 A1 * | 11/2011 | Sakanaka et al. ............ 700/287 |
| 2012/0181795 A1 * | 7/2012 | Lobsiger ............... 290/1 A |

FOREIGN PATENT DOCUMENTS

| | | |
|---|---|---|
| CA | 2 713 628 | 8/2010 |
| CA | 2 755 390 | 8/2010 |
| GB | 2 278 736 A | 6/1993 |
| MX | 2010009334 A | 8/2010 |
| WO | 98/03793 | 7/1997 |

* cited by examiner

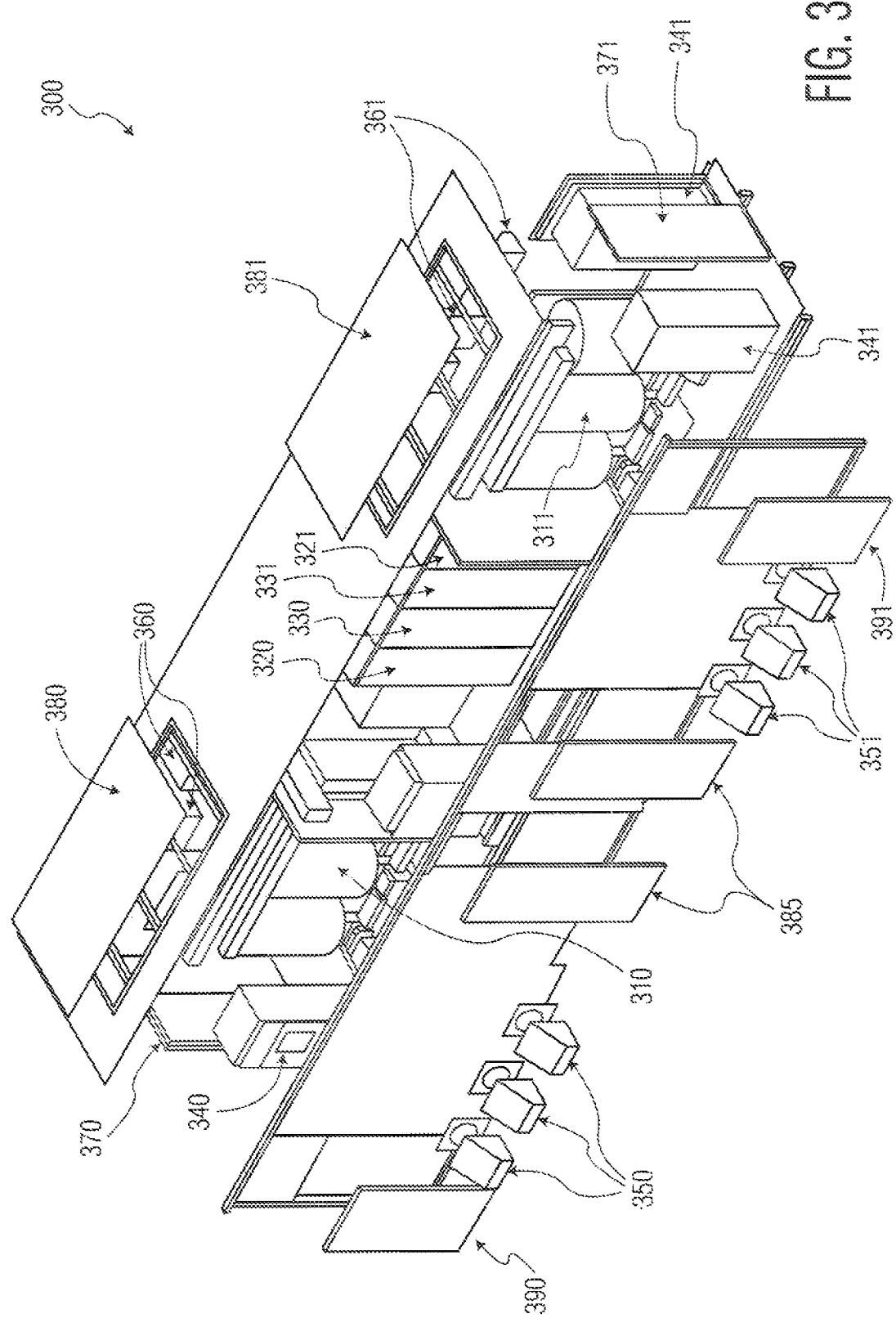

US 8,872,366 B2

SCALABLE PORTABLE MODULAR POWER PLANT

TECHNICAL FIELD

The disclosure is generally related to portable power plants, and more particularly to scalable modular power plants designed for easy portability and installation.

BACKGROUND

Currently, there is a need for power plants that can be easily transported, assembled and made operation at remote sites. Such power plants may be needed, for example, in disaster relief areas, areas affected by blackouts, or any areas where additional electrical power is needed. Such power plants may comprise generators, substations and fuel tanks that can be transported to remotes areas and configured to generate electrical power independently form the power grid.

Power plants that currently exist have a variety of disadvantages. In particular, these power plants are difficult to transport, they require complicated installation and they cannot be easily scaled or controlled. In addition, such power plants are often incapable of producing a sufficient amount of power. Consequently, it is highly desirable to create a new type of a portable modular power plant where each individual component is containerized and designed to make the portable plant simple to transport, install, operate and scale.

SUMMARY

The present disclosure relates generally to a scalable portable modular power plant. In one embodiment, the portable modular power plant may comprise an electrical substation module. The substation module may comprise a container and two transformers housed in this container. The two transformers may be positioned at opposite ends of the substation container. The portable modular power station may further comprise a plurality of containerized electric generator modules that may be connected to either the first or the second transformer. Each electric generator module may be positioned relative to one of the corners of the substation module.

In another embodiment, the electrical substation module may comprise an ISO 40 foot high cube container and two transformers positioned at each end of the high cube container. The electrical substation module may be configured to generate 8 MVA of apparent power, where each of the transformers provides 4 MVA of apparent power.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings:

FIG. 3 shows a perspective view of one embodiment of an electrical substation module.

DETAILED DESCRIPTION

Figure 1:
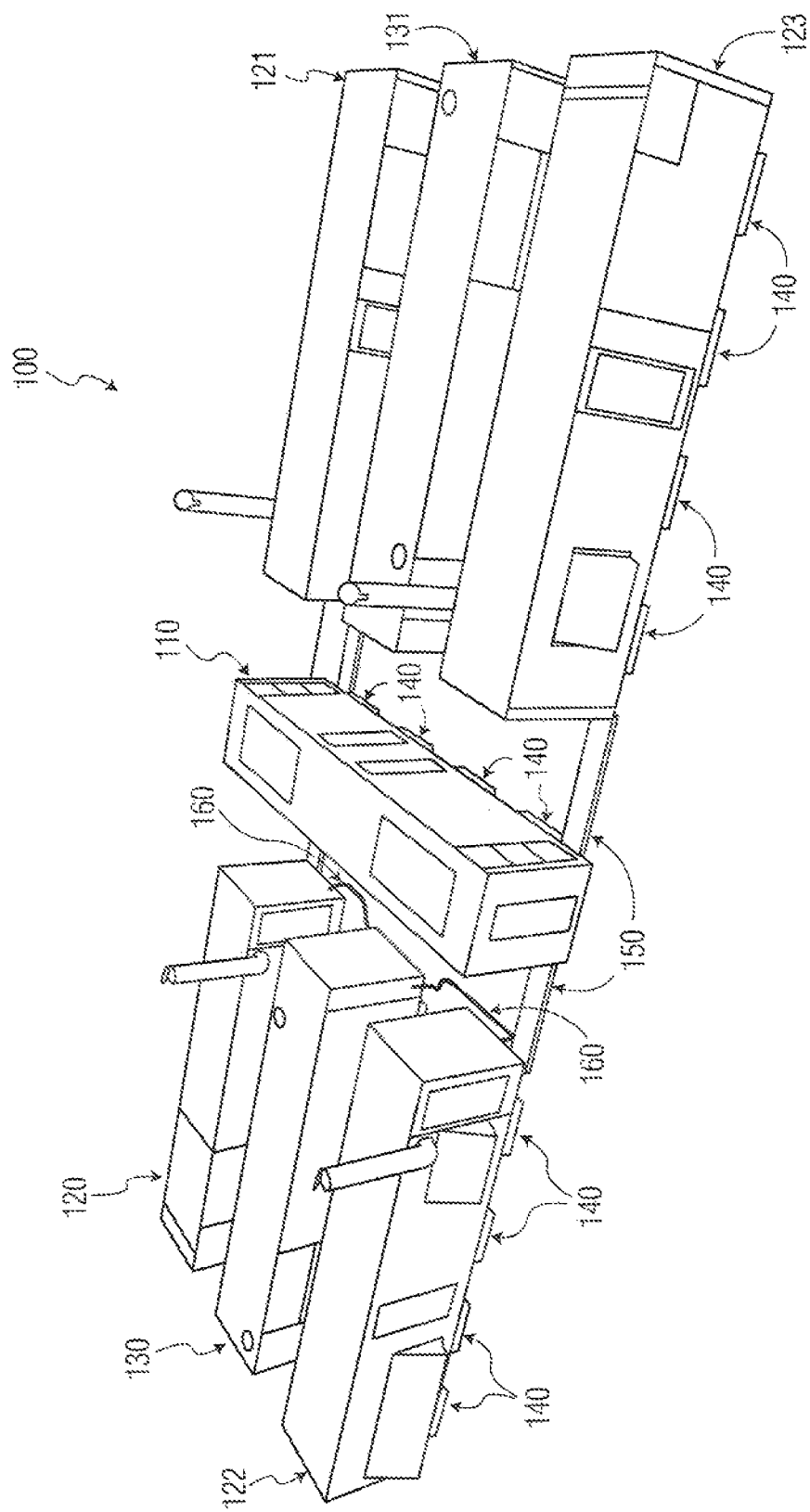
FIG. 1 shows a perspective view of one embodiment of a scalable portable modular power plant.

The present disclosure relates generally to a scalable portable modular power plant comprising several containerized modules, including a containerized electrical substation module and one or more electrical generator modules. In one embodiment, the scalable portable modular power plant also comprises one or more containerized fuel tanks. These containerized modules are designed for easy transport, efficient installation and easy scalability.

For purposes of this disclosure, a substation module shall mean any system or device designed to transform voltage and/or perform other functions necessary to control and distribute generated electrical power.

An electric generator module refers to any system or device designed to generate electrical power by consuming fuel. In one exemplary embodiment, electric generator modules may be driven by reciprocating engines using diesel fuel, natural gas fuel or both.

For purposes of this disclosure the term "containerized" shall mean that a device or a system is entirely contained within a shipping-like container and is suitable for easy transportation. The containers are generally shaped in the form of a rectangular box with two wide sides and two narrow sides. However, other containers of different shapes and sizes may also be used.

In a first exemplary embodiment, the present disclosure relates to a scalable portable modular power plant. The power plant may comprise an electrical substation module and a plurality of containerized electric generator modules. The substation module may comprise a shipping container that houses the other components of the electrical substation module. In one embodiment, the substation container is a 40 feet high cube container conforming to the International Organization for Standardization (ISO) specifications. In another embodiment, the container may measure 40 feet×8 feet×9.6 feet. In another embodiment, other containers of different sizes may be used. The electrical substation container may house two or more power transformers, located at the opposite ends of the substation container. The transformers may be dry type cast coil transformers that are configured to output up to 33 KV star at 50 hz and/or up to 34.5 KV star at 60 hz. Each of the transformers may also be capable of generating 4 MVA of apparent power resulting in the total of 8 MVA apparent power output. Each transformer may comprise one or more low voltage disconnect switches. Each low voltage disconnect switch may be used for isolating an electrical generator module connected to that transformer.

The electrical substation module may further comprise at least one gas insulated cubicle that houses a feeder protection relay. The feeder protection relay may be connected to a network switch. This network connection may be used to remotely control, program and supervise the electrical substation module using either a wireless or wired connection. In one embodiment, the feeder protection relay is connected to the network switch via Ethernet. In another embodiment, other network connections, known in the art, may be used for this connection. The gas insulated cubicle may house plug-in sockets for electrical cables. These sockets may be used to quickly connect the electrical substation module to other substations modules.

The electrical substation module may be connected to several containerized electric generator modules. In one embodiment, the electric generator modules are contained in 40 foot high cube containers conforming to the ISO specifications. In another embodiment, other containers of different sizes may be used. Each of the electric generator modules may be located proximate to a corner of the electrical substation module in order to minimize the amount of needed cabling. Each of the electric generator modules may be electrically connected to at least one of the transformers of the electrical substation module.

In one embodiment, the electric generator modules may be configured to operate using #2 diesel oil fuel, natural gas, or a bi-fuel combination of both diesel and gas. Additionally, the electric generator modules may be configured to use other fuels known in the art.

In one embodiment, the power plant may comprise two groups of electric generator modules. The first group may be located on one side (e.g. a wide side) of the electrical substation container and may have unobstructed access to that side of the electrical substation container. The second group may be located on another side of the electrical substation container and may have unobstructed access to that other side of the electrical substation container.

In another embodiment, the power plant may comprise four electric generator modules. In this embodiment, the first and second generator modules may be connected to the first transformer of the electrical substation module. The third and fourth electric generator modules may be connected to the second transformer of the electrical substation module. The first and third electric generator modules may be located on one side of the electrical substation module, while the second and fourth electric generator modules may be located on an opposite side of the electrical substation module. In this embodiment, the first and third electric generator modules may be positioned parallel to each other and perpendicularly to a first (wide) side of the electrical substation module. The second and fourth electric generator modules may be similarly positioned parallel to each other and perpendicularly to a second (wide) side of the electrical substation module.

In yet another embodiment, a portable modular power plant, in accordance with this disclosure, may also comprise one or more containerized fuel tanks. A first of these fuel tanks may be positioned between first and third electric generator modules, parallel to these electric generators modules and perpendicular to the electrical substation module. A second of these fuel tanks may be positioned between second and fourth electric generator modules, parallel to these electric generators modules and perpendicular to the electrical substation module. Each of the fuel tanks may be connected to at least one electric generator module by fuel lines.

In one embodiment, the electric generator modules may be configured to operate in a local mode. When so configured, the electric generator modules are capable of the following modes of operation: single generator module operating in an island mode, multiple electric generator modules running in parallel together sharing kW & kVAR's in island mode operation, single electric generator modules base loaded against a larger power system or utility grid operating at a fixed power factor, and an emergency standby mode.

In another embodiment, the electric generator modules may be configured to be operated by remote control. In this embodiment, multiple electric generator modules maybe configured to operate in parallel under the control of a master controller. When so configured, the electric generator modules are capable of the following modes of operation: fixed export power level in base load against a larger power system or utility grid, peak shaving against a larger power system or utility grid, import\export power control against a larger power system or utility grid, power export against a larger power system or utility grid with frequency support PID control, VAR/PF control and a mode for black start of the local isolated power system or utility grid substation that is isolated from the main transmission system.

In another exemplary embodiment, the present disclosure relates to a containerized electrical substation module suitable for use in a scalable portable modular power plant. The electrical substation module may comprise a shipping-like container for housing the other components of the electrical substation module. In one embodiment, the substation container is a 40 foot high cube container conforming to the ISO specifications. In another embodiment, other containers of different sizes may be used. The substation container may house two or more power transformers, located at the opposite ends of the container. The transformers may be dry type cast coil transformers configured to output up to 33 KV star at 50 hz and/or up to 34.5 KV star at 60 hz. Each of the transformers may be capable of generating 4 MVA of apparent power resulting in the total of 8 MVA apparent power output. Each transformer may comprise one or more low voltage disconnect switches. Each low voltage disconnect switch may be used for isolating an electrical generator module connected to that transformer. Each transformer may also comprise a plurality of taps positions that can be used to adjust the output voltage of each transformer.

In one embodiment, the electrical substation module may further comprise two or more 630 amp gas insulated cubicles (one per each transformer) and two or more 1250 amp gas insulated cubicles. Other types of gas insulated cubicles may also be used in other embodiments. These cubicles may be located in the substation container between the transformers. The cubicles may be accessed from a controller room located in a middle portion of the substation container and through access doors installed on an outer side of the substation container. The gas insulated cubicles may also house plug-in sockets for electrical cables. These sockets may be used to quickly connect the substation module to other substations modules.

In one embodiment, the 630 amp gas insulate cubicles may each contain a control transformer protection relay designed for protecting the electrical substation module transformers.

In another embodiment, the 1250 amp gas insulated cubicles may each contain a bay control feeder protection relay for transferring power in and out of the electrical substation module. The feeder protection relay may be connected to a network switch. This network connection may be used to remotely control, program and supervise the electrical substation module using either a wireless or wired connection. In one embodiment, the feeder protection relay is connected to a network switch via Ethernet, however other network connection known in the art may be used for this purpose.

Turning now to FIG. 1, an exemplary embodiment of a scalable portable modular power plant 100 is shown. The exemplary scalable portable modular power plant may be capable of producing 8 MVA blocks of 50 Hz or 601 Hz power.

In this embodiment, the scalable portable modular power plant 100 comprises a containerized substation module 110, four containerized generator modules 120, 121, 122, 123 using reciprocating engines as the prime movers and containerized storage fuel tanks 130, 131. When connected together, the substation module 110, the generator modules 120, 121, 122, 123 and the storage fuel tanks 130, 131 may comprise a power block capable of outputting 8 MVA of apparent energy. In one embodiment, each such block may be connected both electrically and mechanically to other blocks to build a larger power system.

In one embodiment, the substation module 110, the containerized generator modules 120, 121, 122, 123 and the storage fuel tanks 130, 131 may each be contained in separate 40 foot high cube containers conforming to the ISO specifications. The storage fuel tanks 130, 131 may be up to 12,900 US gallon bulk storage fuel tanks or larger.

In one embodiment, each of the substation module 110, the generator modules 120, 121, 122, 123 and the storage fuel tanks 130, 131 may be positioned on high density plastic ties 140. The plastic ties provide stability to the modules of the portable modular power plant 100 and may be cheaper and faster to install than traditional concrete foundations. In another embodiment, each of the substation module 110, the generator modules 120, 121, 122, 123 and the storage fuel tanks 130, 131 may be positioned on concrete foundations.

Each of the generator modules 120, 121, 122, 123 may be a reciprocating engine driven generator configured to use #2 diesel fuel oil and/or natural gas as fuel. In another embodiment, each of the generator modules 120, 121, 122, 123 may be configured to operate in bi-fuel operation using both diesel oil and natural gas. The generator modules 120, 121, 122, 123 may be configured to have different fuel configurations from one another. For example, in one embodiment, the generator module 120 may be configured to operate using diesel fuel, the generator module 121 may be configured to use natural gas, and the generator module 123 may have a bi-fuel configuration.

In one embodiment, the substation module 110 is positioned in a central portion of the power block. The generator modules 120, 121, 122, 123 are positioned at each corner of the substation module 110. In this embodiment, the generator modules 120 and 122 are positioned on one side of the substation module 110, while the generator modules 121 and 123 are positioned on the opposite side of the substation module 110. In this embodiment, the generator modules 120 and 122 are positioned perpendicular to the first wide side of the substation module 110, while the generator modules 121 and 123 are positioned perpendicular to the second opposite wide side of the substation module 110.

In one embodiment, the substation module 110 comprises two transformers. The first transformer may be positioned at one end of the substation module 110, while the second transformer may be positioned at the other end of the substation module 110. In this embodiment, the generator modules 120 and 121 may be connected to the first transformer, while the generator modules 122 and 123 may be connected to the second transformer. In one embodiment, the generator modules 120, 121, 122, 123 may be connected to the substation module 110 via 2 kV low voltage cables, 35 kV medium voltage cables and via control cables. However, a plurality of other cables, known in the art, may be used to connect the generator modules 120, 121, 122, 123 and the substation module 110. These cables may be contained in a plurality of fiberglass cable trays 150 placed between the substation module 110 and the generator modules 120, 121, 122, 123.

In yet another embodiment, the first storage fuel tank 130 may be positioned between the generator modules 120 and 122. The second storage fuel tank 131 may be positioned between the generator modules 121 and 123. The first storage fuel tank 130 may be positioned relatively parallel to the generator modules 120 and 122 and relatively perpendicular to the first wide side of the substation module 110. The second storage fuel tank 131 may be positioned relatively parallel to the generator modules 121 and 123 and relatively perpendicular to the second wide side of the substation module 110. In one embodiment, the storage fuel tank 130 may be connected to the generator modules 120 and 122 via quick connect fuel connections 160. The storage fuel tank 131 may be connected to the generator modules 121 and 123 via quick connect fuel connections (not shown).

Figure 2A:
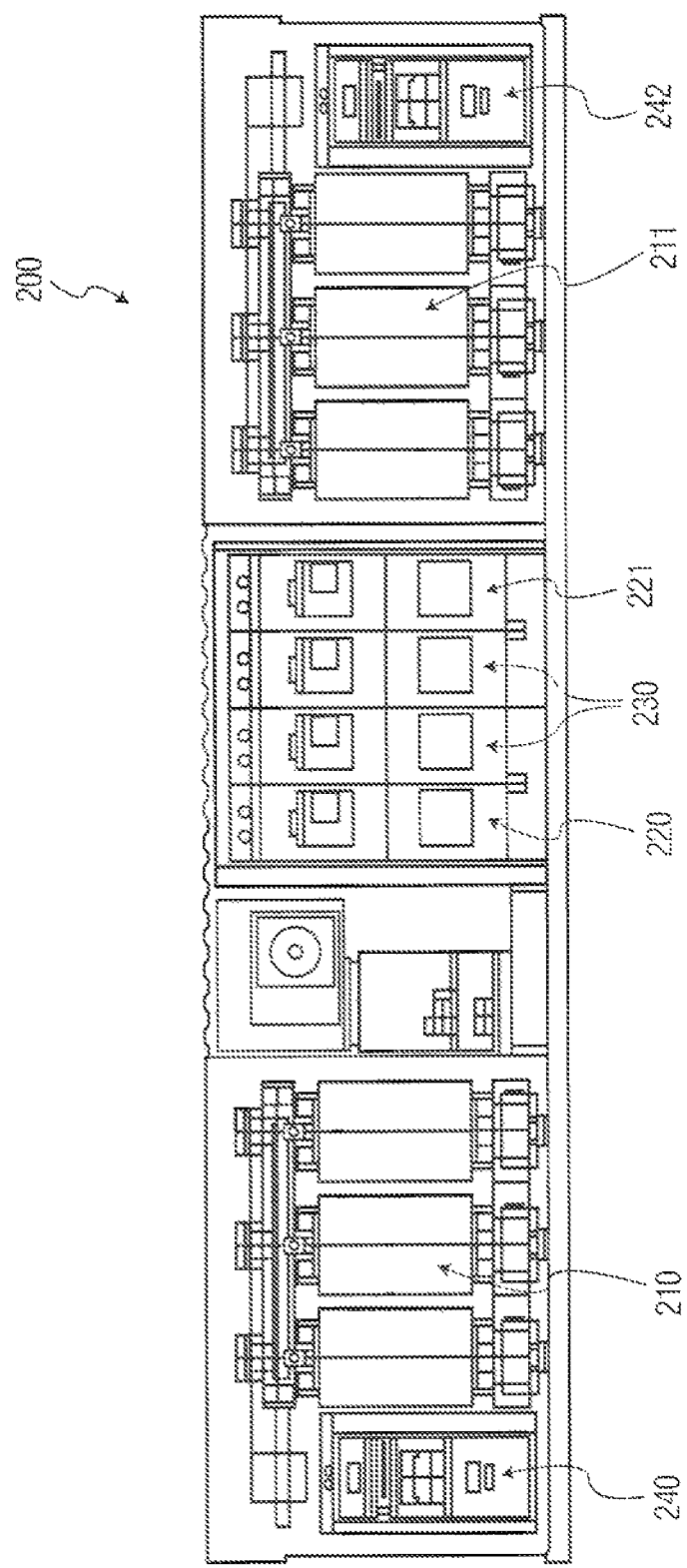
FIG. 2A shows a front view of one embodiment of an electrical substation module.
Figure 2B:
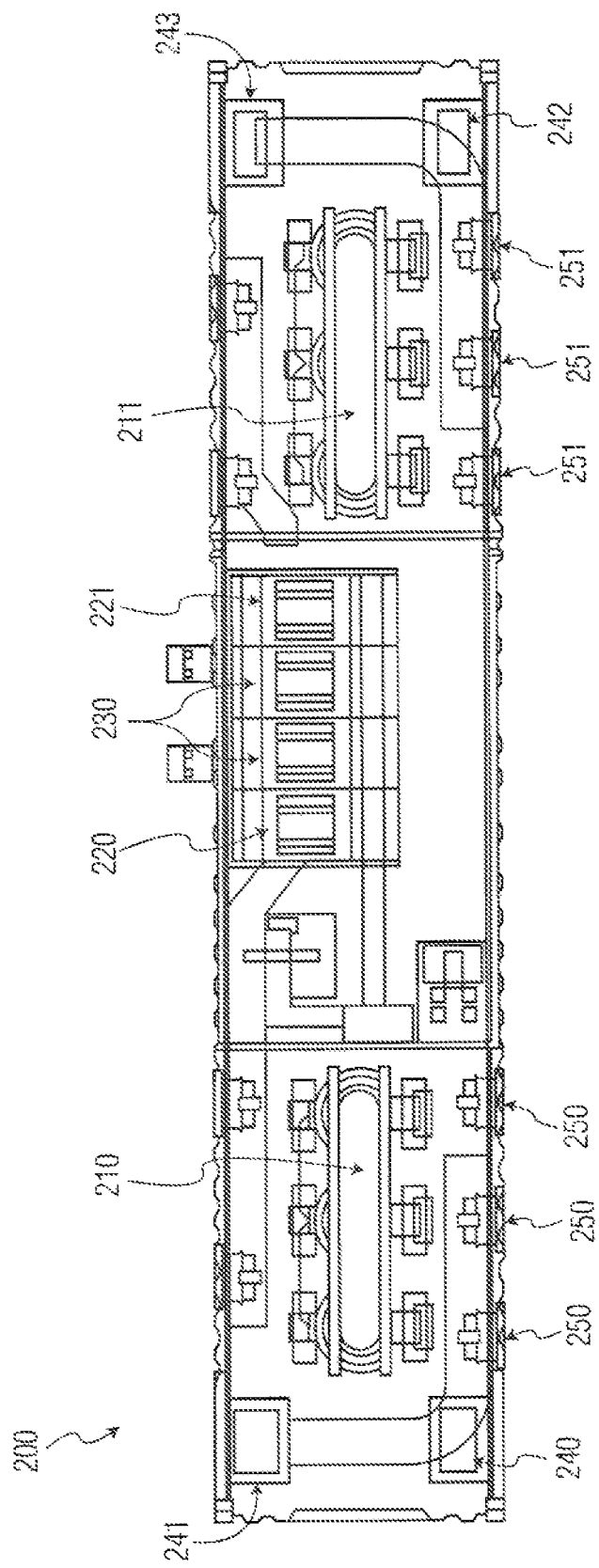
FIG. 2B shows a top view of one embodiment of an electrical substation module.
Figure 4A:
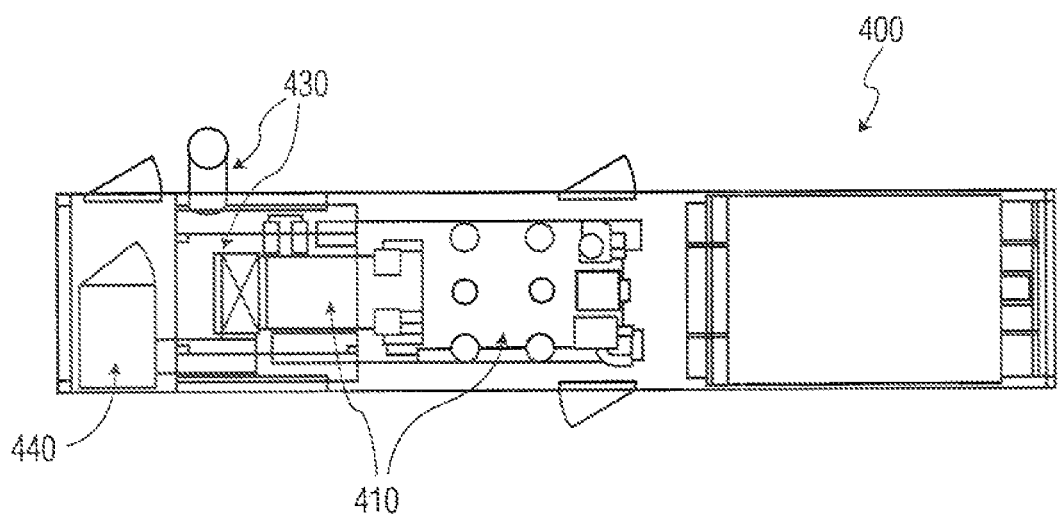
FIG. 4A shows a top view of one embodiment of an electric generator module.
Figure 4B:
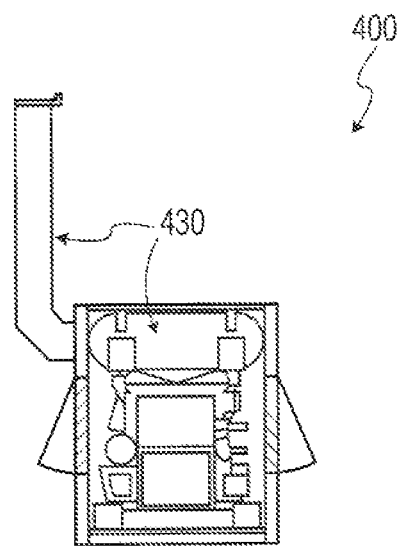
FIG. 4B shows a first side view of one embodiment of an electric generator module.
Figure 4C:
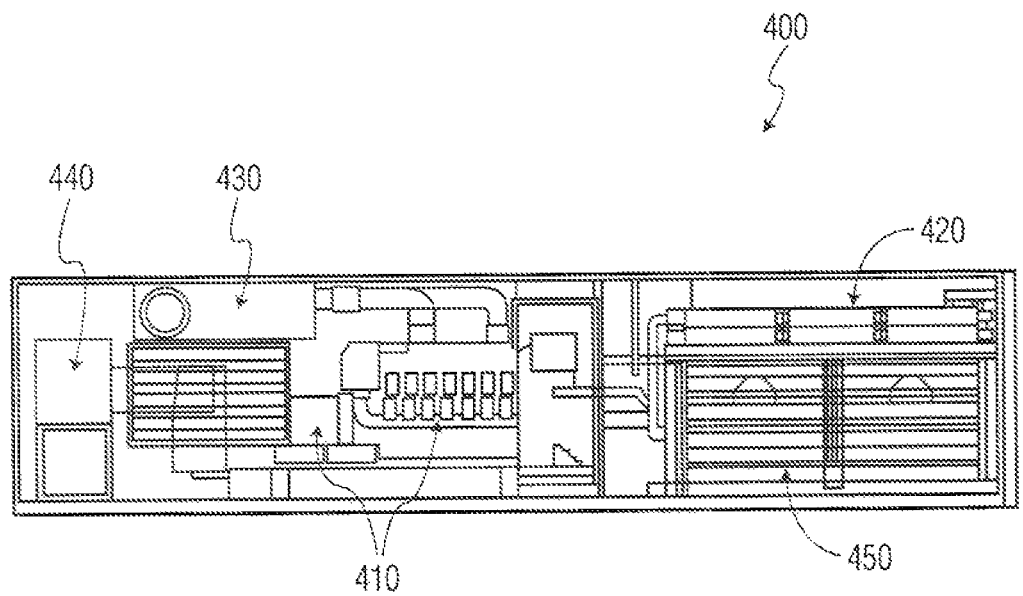
FIG. 4C shows a front view of one embodiment of an electric generator module.
Figure 4D:
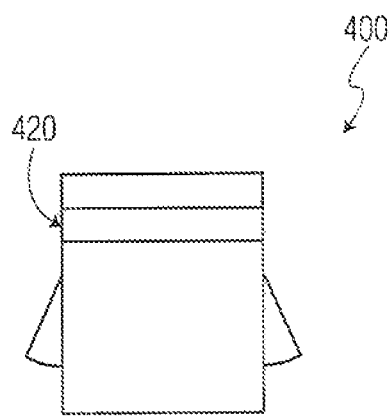
FIG. 4D shows a second side view of one embodiment of an electric generator module.

Turning now to FIGS. 2A and 2B, an exemplary embodiment of an electrical substation module 200 is shown. In this embodiment, the substation module 200 comprises a first transformer 210 located at one end of the substation module 200 and a second transformer 211 located at a second (opposite) end of the substation module 200. Each of the transformers 210, 211 may be placed in its own compartment with integral forced air cooling. The first transformer's 210 compartment may comprise any number of supply fans 250 (e.g. one to three, or more). The second transformer's 211 compartment may also comprise any number of supply fans 251.

Each of the transformers 210, 211 may be a 4 MVA dry type cast coil transformer rated at 100% capacity for 400V 3 phase Delta 50 hz stepping up to 11 KV or 22 kV or 33 KV star with a Dyn11 vector group. Each of the transformers 210, 211 may also be rated at 100% capacity for 480V 3 phase Delta 60 hz stepping up to 13.2 KV or 26.4 kV or 34.5 KV star with a Dyn11 vector group. Each of the major tap positions of each of the transformers 210, 211 may have up to 8 taps positions, or more, to adjust output voltage.

In one embodiment, the first transformer 210 may comprise one or more (e.g. two) low voltage disconnect switches 240, 241 located at low voltage side of the first transformer 210. The second transformer 211 may also comprise one or more (e.g. two) low voltage disconnect switches 242, 243 located at a low voltage side of the second transformer 211. These low voltage disconnect switches 240, 241, 242, 243 may each be configured to isolate a generator that may be connected to each of the transformers 210, 211.

In one embodiment, the substation module 200 may comprise one or more 630 amp gas insulated cubicles 220, 221, one for each of the transformers 210, 211. Each of the 630 amp gas insulated cubicles 220, 221 may contain one or more SF6 circuit breakers, one or more disconnect switches and one or more earthing switches. Each of the 630 amp gas insulated cubicles 220, 221 may be controlled by bay control transformer protection relays. In one embodiment, the bay control transformer protection relays are ABB RET630 control transformer protection relays. In another embodiment, the bay control transformer protection relays are RET615 control transformer protection relays. Alternatively, other types of control transformer protection relays may be used.

In one embodiment, the substation module 200 may comprise one or more 1250 amp gas insulate cubicles 230. These 1250 amp gas insulate cubicles 230 may be positioned between the 630 amp gas insulate cubicles 220, 221. Each of the 1250 amp gas insulate cubicles 230 may contain one or more SF6 circuit breakers, one or more disconnect switches and one or more earthling switches. Each of the 1250 amp gas insulate cubicles 230 may be controlled by a bay control feeder protection relays. In one embodiment, the bay control transformer protection relays are ABB RET630 control transformer protection relays. In another embodiment, the bay control transformer protection relays are RET615 control transformer protection relays. Alternatively, other types of control transformer protection relays may be used.

The bay control feeder protection relays may be used to transfer power in and out of the substation module 200 to allow the substation module 200 to be connected in series to other substation modules in a daisy-chain fashion. In one embodiment, the daisy chain connection between multiple 8 MVA substation modules may be accomplished using 35 kV single conductor 500 mcm type SH portable substation power cables with Pfisterer MV-CONNEX size 3 separable plug-in connectors. In one embodiment, two cables may be used per phase, for a total capacity of 1200 amps. Alternatively, other cables, in other quantities known in the art, may be used.

The bay control feeder protection relays (not shown) may be connected together using a network switch. For example, the network switch may be an Ethernet switch, a wireless switch or any other network switch known in the art. The network switch may be used for programming, controlling and supervising the substation module 200 from a central control room or a remote location via wired or wireless communication. The network switch of the substation module 200 may be connected to other network switches of other substation modules in a daisy-chain fashion to enable a remote access of the entire power system.

In one embodiment, each of the gas insulated cubicles 220, 221, 230 may be configured for a maximum voltage of 40.5 KV and 31.5 KA fault current. The gas insulated cubicles 220, 221, 230 may be linked together using a common SF6 insulated bus rated at 1250 amps, or using any other suitable connections.

In one embodiment, each of the gas insulated cubicles 220, 221, 230 may comprise Pfisterer MV-CONNEX size 3 separable plug-in sockets for the electrical cable connection to the transformers 210, 211 and to other substation modules.

Turning now to FIG. 3, an exemplary embodiment of an electrical substation module 300 is shown. In this embodiment, the substation module 300 comprises a first transformer 310 located at one end of the substation module 200 and a second transformer 311 located at a second (opposite) end of the substation module 300. Each of the transformers 310, 311 may be positioned in its own compartment with integral forced air cooling. The first transformer's 310 compartment may comprise any number of supply fans 350. The second transformer's 311 compartment may similarly comprise any number of supply fans 351. The first transformer's 310 compartment may also comprise any number of discharge fans 360. Similarly, the second transformer's 311 compartment too may comprise any number of discharge fans 361.

Access to the first transformer 310 may be provided by a first end door 370 built into the first narrow side of the substation module 300. Access to the first transformer 310 may also be provided by a first side door 390 built into the wide side of the substation module 300. Access to the first transformer 310 may additionally be provided by a first removable roof cover 380.

Access to the second transformer 311 may be provided by a second end door 371 built into the second narrow side of the substation module 300. Access to the second transformer 311 may also be provided by a second side door 391 built into the wide side of the substation module 300. Access to the second transformer 311 may additionally be provided by a second removable roof cover 381.

In one embodiment, the first transformer 310 may comprise a low voltage disconnect switch 340, located at the low voltage side of the first transformer 310. The second transformer 311 may comprise two low voltage disconnect switches 341 located at the low voltage side of the second transformer 311. These low voltage disconnect switches 340, 341 may each be configured to isolate a generator (not shown) that may be connected to at least one of the transformers 310, 311.

In one embodiment, the transformer 310 may comprise four gas insulated cubicles 320, 321, 330, 331. The gas insulated cubicles 320, 321, 330, 331 may be located inside a controller room in a middle portion of the substation module 300. Access to the gas insulated cubicles 320, 321, 330, 331 may be provided by one or more doors 385 built into a side of the substation module 300. In another embodiment, access to the gas insulated cubicles may also be provided by one or more rear doors (not shown) built into the second wide side of the substation module 300.

Turning now to FIGS. 4A, 4B, 4C and 4D, an exemplary embodiment of an electric generator module 400 is shown. The electric generator module 400 may comprise a purpose-built ISO 40 foot high cube freight container with a protective shipping cover that functions as a rain guard and noise reduction hood on all air intake openings.

In this embodiment, the electric generator module 400 may comprise an engine and generator 410, jacket water & Separate Circuit After-Cooled (SCAC) air cooled radiator systems 420, an exhaust system 430, and a control & automation system 440. The control & automation system may include a main low voltage circuit breaker.

In one embodiment, the electric generator module 400 may comprise a fuel storage tank 450. In one embodiment, the fuel storage tank 450 may be designed to store diesel oil. In another embodiment, the electric generator module 400 may comprise a gas pressure regulator train.

The control & automation system 440 may allow the generator module 400 to be controlled and operated locally or remotely as a part of a larger system using Modbus over Transmission Control Protocol and Internet Protocol (TCP\IP) using Ethernet Cat 5 cable or Wi-Fi networks in conjunction with a Controller Area Network (CAN) Bus communications protocol using shielded twisted pair copper cables.

When the generator module 400 is operated in local mode, it may be capable of the following modes of operation: single generator module operating in island mode, multiple generator modules running in parallel together sharing kW & kVAR's in an island mode, single generator module base loaded against a larger power system or utility grid operating at a fixed power factor and an emergency standby mode, either as a single generator or multiple units in parallel that can be remote started by an automatic transfer switch.

In another embodiment, the generator module 400 and other generator modules may be operated by remote control. Multiple generator modules connected in parallel and operating under the control of a single master controller may be capable of the following modes of operation: fixed export power level in base load against a larger power system or utility grid, peak shaving against a larger power system or utility grid, import\export power control against a larger power system or utility, power export mode against a larger power system or utility grid with frequency support proportional-integral-derivative (PID) control, Volt-Ampere Reactive/Power Factor (VAR/PF) control mode and a black start mode for the local power system or utility grid substation that is isolated from the main transmission. The VAR/PF control mode may have the following modes: with a fixed power factor at all the running generator modules in the power plant, with a fixed power factor at the generator modules within the automation control groups in the power plant, maintaining a fixed power factor at the interconnect and maintaining a fixed voltage at the interconnect with voltage support PID control utilizing the power factor control at the generator modules.

In one embodiment, the scalable portable modular power plant may also comprise a power plant metering and automatic control system. The power plant metering and automatic control system may comprise a four quadrant digital energy, power quality and metering device with an accuracy of approximately 0.2% that is connected to International Electrotechnical Commission (IEC) 0.2 S accuracy class current transformers and approximately 0.2% accuracy class potential transformers on the medium voltage and/or the high voltage interconnect bus to the customer. The four quadrant digital energy, power quality and metering device may be used for metering all energy delivered and received at the power plant. The taps off of the metering class current and potential transformers may also be used by the power plant automation system to control the power flow delivered to the customer.

In one embodiment, the data collected by the metering and automatic control system may be recorded, in real-time, over TCP\IP Ethernet network into a SQL database hosted on a local server in the power plant control room. This local server may provide the user interface to workstations connected to the network to allow the power plant operators to control the daily monitoring and operation of the power plant.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A scalable portable modular power plant comprising:
   an electrical substation module comprising:
      a substation container comprising a first transformer positioned at a first end of the substation container and a second transformer positioned at a second end of the substation container, said substation container further comprising means for electrically connecting a plurality of electric generator modules to said first and second transformers; and
      a plurality of electric generator modules, each contained in a respective shipping container that is separate from and external to said substation container, said electric generator modules positioned relative to a corner of the substation container, said electric generator modules being independently connectable to at least one of the first transformer and the second transformer via the connecting means of the substation container.

2. The power plant of claim 1, wherein the plurality of containerized electric generator modules are configured to have at least one of the following fuel configurations: diesel fuel oil configuration, natural gas configuration, and bi-fuel configuration burning both diesel fuel and natural gas.

3. The power plant of claim 1, wherein the substation container comprises an International Organization for Standardization (ISO) 40 foot high cube container.

4. The power plant of claim 1, wherein the electrical substation module is configured to generate 8 MVA of apparent power, 4 MVA each from the first and second transformers.

5. The power plant of claim 1, wherein the first transformer and the second transformer comprise dry type cast coil transformers configured to output up to 33 KV star at 50 hz and up to 34.5 KV star at 60 hz.

6. The power plant of claim 1, wherein the electrical substation module further comprises at least one plug-in socket for an electrical cable connection to at least one other electrical substation module.

7. The power plant of claim 1, wherein the first transformer and the second transformer each comprise at least one low voltage disconnect switch for isolating the electric generator modules connected to each transformer.

8. The power plant of claim 1, wherein the electrical substation module further comprises at least one bay control feeder protection relay, the at least one bay control feeder protection relay being connected to a network switch that enables wired or wireless remote control, programming and supervision of the electrical substation module.

9. The power plant of claim 1, where the plurality of containerized electric generator modules comprise a first subset of electric generator modules and a second subset of electric generator modules, each subset positioned on a respective side of said electrical substation module such that each subset has unobstructed access to said respective side.

10. The power plant of claim 1, wherein the plurality of containerized electric generator modules comprises four electric generator modules, wherein a first and a second of the electric generator modules are connected to the first transformer, and wherein a third and a fourth of the electric generator modules are connected to the second transformer.

11. The power plant of claim 10, wherein the first and third electric generator modules are positioned on a first wide side of the electrical substation module in a perpendicular orientation and the second and fourth electric generator modules are positioned on a second wide side of the electrical substation module in a perpendicular orientation.

12. The power plant of claim 11, further comprising:
   a first containerized fuel tank positioned between and substantially parallel to the first and third electric generator modules; and
   a second containerized fuel tank positioned between and substantially parallel to the second and fourth electric generator modules,
   wherein each of the first and second fuel tanks is connected to at least one electric generator module by a fuel line.

13. The power plant of claim 1, wherein the plurality of electric generator modules are configured to operate in a local mode according to one or more one of the following modes of operation: a single electric generator module operating in an island mode, a plurality of electric generator modules running in parallel in island mode, a single electric generator module loaded against a larger utility grid operating at fixed power factor and an emergency standby mode.

14. The power plant of claim 1, wherein the plurality of electric generator modules configured to operate via remote control according to one or more one of the following power control modes of operation: a fixed export power level against a larger unity grid, peak shaving against a larger unity grid, an import/export power control against a larger unity grid, Volt-Ampere Reactive/Power Factor (VAR/PF) control and a black start of the local isolated utility grid.

* * * * *

UNITED STATES PATENT AND TRADEMARK OFFICE
CERTIFICATE OF CORRECTION

| | | Page 1 of 1 |
|---|---|---|
| PATENT NO. | : 8,872,366 B2 | |
| APPLICATION NO. | : 13/909336 | |
| DATED | : October 28, 2014 | |
| INVENTOR(S) | : Edmund M. Campion et al. | |

It is certified that error appears in the above-identified patent and that said Letters Patent is hereby corrected as shown below:

In the Specification

Column 4, line 61, replace "601 Hz" with --60Hz--

Signed and Sealed this
Third Day of March, 2015

Michelle K. Lee
*Deputy Director of the United States Patent and Trademark Office*